June 5, 1956 R. W. BARNES ET AL 2,749,066
AID TO PACKING, DEPLOYMENT, AND INITIAL INFLATION OF PARACHUTES
Filed Jan. 26, 1954
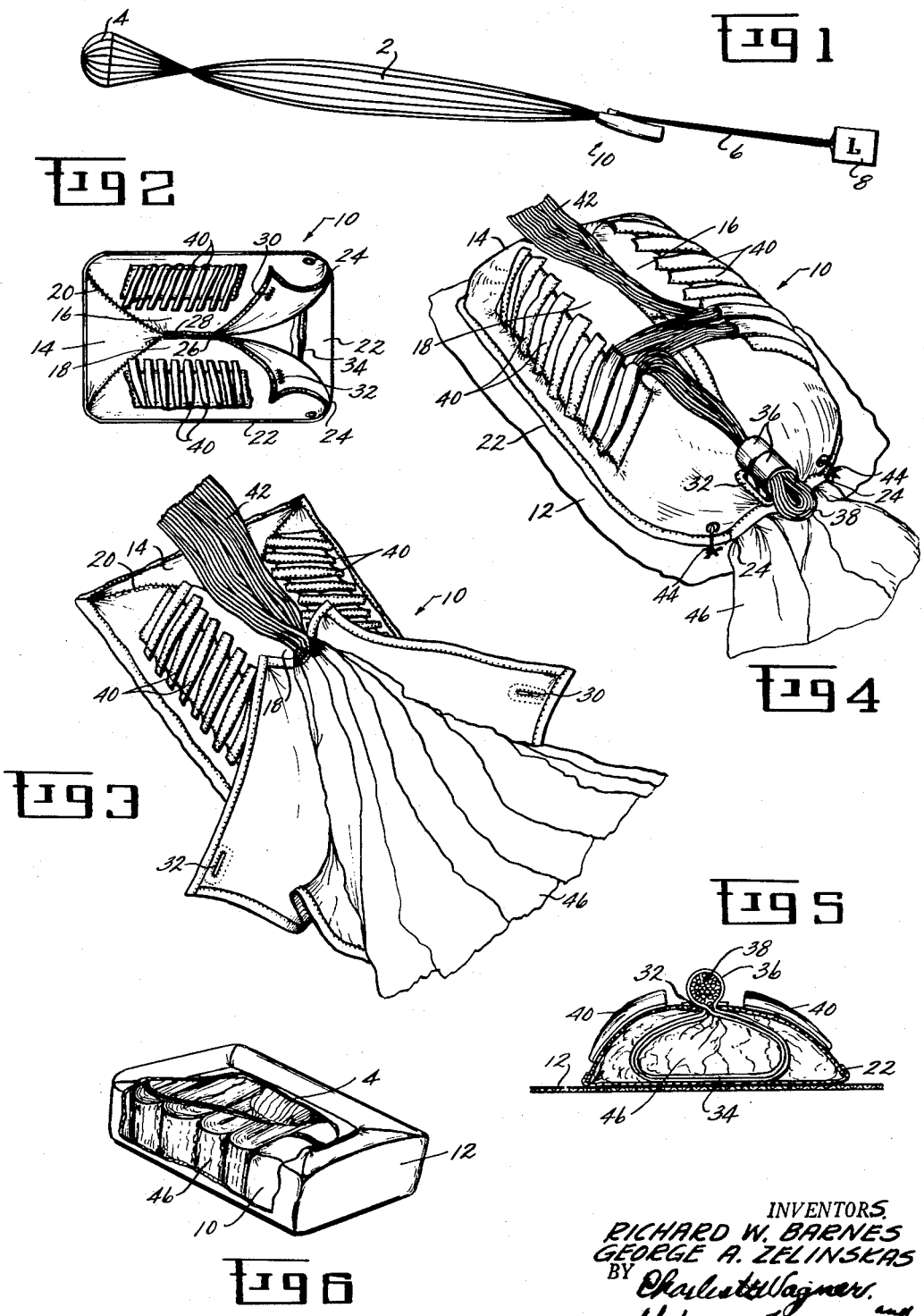
INVENTORS.
RICHARD W. BARNES
GEORGE A. ZELINSKAS United States Patent Office 2,749,066
Patented June 5, 1956

2,749,066

AID TO PACKING, DEPLOYMENT, AND INITIAL INFLATION OF PARACHUTES

Richard W. Barnes, Xenia, and George A. Zelinskas, Dayton, Ohio

Application January 26, 1954, Serial No. 406,374

13 Claims. (Cl. 244—148)

(Granted under Title 35, U. S. Code (1952), sec. 266)

The invention described herein may be manufactured and used by or for the Government for governmental purposes without the payment to us of any royalty thereon.

This invention relates to parachutes and is directed particularly to constructions which control the deployment and initial stages of opening of a parachute upon release thereof from a pack.

It has long been recognized that the release of a parachute canopy and its shroud lines from its pack should be controlled in such a way as to insure consistent and safe operation. If deployment of the parachute is not properly controlled many different types of damage or failure may occur. Thus, for example, if the canopy emerges bodily from the pack in a folded wad or if the skirt of the canopy is exposed prematurely to the air stream, a portion of the canopy may whip over the peak or other still folded portions with the result that one or more shroud lines will be drawn over the canopy causing friction burns or tears in the fabric. The lines further may become dangerously snarled or may wrap about the canopy or about the wearer's arm or leg preventing proper or effective opening of the canopy. In some instances, the canopy or a portion thereof may turn inside out.

It is also known that deployment and opening of a parachute is accompanied by two different shocks upon the wearer, one of which is known as the "snatch force" and results upon the taking up of the slack in the shroud lines and lift webs whereupon the still unopened canopy is accelerated to the speed of the wearer. The other shock, known as the "opening shock" occurs when the canopy is fully expanded and serves to decelerate the fall. Either or both of these shocks may be so severe as to cause great discomfort or even injure the wearer. However, the snatch force will be greatly reduced if the canopy is properly extended and deployed as the slack in the shroud lines is taken up.

When a parachute is released at high speed the hazards presented by imperfect deployment of the canopy and shroud lines are greatly increased. Moreover, modern parachute canopies designed for use at high speeds are frequently provided with guide vanes or turbulence promoting projections extending below the skirt of the canopy. When using constructions of this type, proper deployment of the canopy and shroud lines is of even greater importance in order to prevent the vanes or extensions from being drawn out of the pack prematurely.

Devices heretofore suggested for controlling the deployment of a parachute have in general been attached to the pack cover or to the canopy itself. However, pack attached restraining means do not permit extension of the shroud lines before release of the skirt and they tend to delay deployment of the entire canopy. Moreover, the snatch force and opening shock are then applied almost simultaneously and, as a result, the discomfort to the wearer and the strains upon the canopy, shroud lines and harness are increased. On the other hand, canopy attached restraining means place localized strain on the canopy and present an additional element which may become entangled with the shroud lines. Moreover, when the restraining means presents an extended area to the air stream, it tends to whip the skirt upward in a manner which increases the danger of entanglement of the lines and may even cause inversion of the whole canopy. In addition, such means can and have caused friction burns and turbulence sufficient to produce inconsistent operation.

It has further been suggested that the entire canopy be enclosed in a deployment delaying bag from which the canopy is drawn by a pilot chute or static line. However, the pilot chute or the whole bag sometimes is caught between the wearer's legs or between the arms and body or upon equipment carried by the wearer. The pilot chute then is incapable of drawing the canopy from its enclosing bag or may do so in a slow and faulty manner. At other times the pilot chute or bag is so shielded by the wearer's body that the canopy cannot be fully or quickly extracted from the bag. As a result, deployment of the canopy entirely enclosed within a deployment bag has been dangerously slow and has on occasion been fatally delayed.

In accordance with the present invention these objections and limitations of prior art constructions are overcome and means are provided which insure proper deployment of the canopy and shroud lines so as to eliminate the dangers inherent in constructions of the prior art.

These advantages are preferably attained by providing the parachute with a bag or enclosure for only a limited portion of the canopy including the skirt and any guide vanes or extensions thereon. A large portion of the canopy including the peak thereof is exposed to be drawn easily from the pack. The resistance or drag offered by this exposed portion of the canopy is thereby added to that of the pilot chute and serves to straighten out the canopy and shroud lines and to pull them free of the wearer's arms or legs and preclude blanketing of the canopy in the air stream by the shielding action of the user's body. The bag enclosing the skirt is preferably retained in place by the shroud lines so as to shield the skirt and any vanes or extensions thereon until both the canopy and the shroud lines are safely extended. Thereafter, the enclosure is released by the application of further tension on the shroud lines so that the canopy may open in a controlled or proper manner, whereas the bag or enclosure floats away and presents no interference to operation of the parachute.

One of the objects of the present invention is to provide novel and improved means for insuring predetermined and orderly deployment of the parachute canopy, shroud lines and harness risers and proper opening of a parachute canopy.

Another object of the invention is to provide a parachute with means for aiding its operation at high speeds.

A further object of the invention is to provide means for reducing the "snatch forces" developed prior to complete inflation of the canopy.

A further object of the invention is to provide a parachute with means for shielding the skirt and lower portion of the canopy from the air stream and to hold the skirt in place for proper inflation until the canopy is properly extended and thereafter to release the canopy from the skirt in a manner to avoid interference with the operation of the parachute.

Another object of the invention is to provide means for utilizing the drag developed by the upper portion of the canopy to aid in deploying the canopy and shroud lines.

A specific object of the invention is to provide an enclosure for the skirt and lower portion of a parachute canopy which is retained in shielding position by the suspension of shroud lines but is releasable upon the application of tension to such lines and thereafter is disengaged completely from the parachute.

These and other objects and features of the invention will appear from the following description thereof in which reference is made to the figures of the accompanying drawings.

In the drawings:

Fig. 1 is a diagrammatic side elevation showing the canopy and shroud lines in the position they assume before enclosure within a parachute pack, which incidentally is also the position they attain immediately prior to release of the skirt and lower portion of the canopy from its bag or enclosure;

Fig. 2 is a plan view of a preferred form of skirt retaining bag embodying the present invention;

Fig. 3 is a perspective showing the manner in which the skirt portion of a canopy may be enclosed in the bag of Fig. 2 prior to final closing thereof;

Fig. 4 is a perspective showing the bag of Fig. 2 with the skirt and lower portion of the canopy fully enclosed and held in place by the shroud lines;

Fig. 5 is a diagrammatic sectional view through the parachute canopy adjacent the mouth of the enclosing bag; and Fig. 6 is a longitudinal sectional view partly in perspective illustrating a typical parachute pack having a parachute with a skirt retaining bag embodying the present invention enclosed therein.

In that form of the invention chosen for purposes of illustration in the drawings, the parachute is shown as having a canopy 2 to the peak of which is secured a pilot chute 4 designed to withdraw the parachute from the pack in which it is enclosed. Shroud lines 6 are attached to the canopy and suitably connected to the wearer or load 8. The skirt and lower portion of the canopy are enclosed within a bag or a retainer 10 which in turn is further enclosed within a parachute pack 12 preparatory for use.

A preferred form of skirt retaining means 10 is illustrated in Figs. 2 and 3, as shown, in the form of a bag which may be generally retangular in shape and relatively flat in cross section. The lower end of the bag is closed by a flap 14, whereas the sides of the bag embody the flaps 16 and 18 which are securely stitched to the end flap 14 at 20 to close the lower end of the bag. The flaps 16 and 18 are further stitched or otherwise secured to the base 22 of the bag along the sides thereof to points 24 near the open end of the bag. The inner edges 26 of the side flaps 16 and 18 overlap and are stitched together for only a short distance as indicated at 28 in Fig. 2 so that the side flaps may be turned back or spread apart for inserting the skirt portion of the canopy and any guide vanes or extensions on the skirt of the canopy into the bag and to permit ready release thereof when the bag is opened. The upper ends or corners of the side flaps 16 and 18 are provided with slots similar to button holes as indicated at 30 and 32 through which the opposite ends of a bag closing strap 34 may be passed.

The strap 34 may be secured to the parachute canopy or to the base 22 of the bag as desired or it may be detached from either the bag or the canopy and merely placed in position in closing the bag and allowed to float away when the bag is opened in use. The strap 34 is located beneath the radially folded canopy preparatory to packing and is positioned about one quarter way from the skirt to the peak of the canopy. During packing the looped ends 36 of the strap 34 are brought upward and inward about the canopy and are passed through the slots 30 and 32 on the side flaps to receive a loop 38 of the shroud lines for holding the mouth of the retaining bag closed. The mouth of the bag is preferably so restricted by the strip 34 as to grip the extending portion of the canopy so as to prevent the bag from being stripped off prematurely by the air stream to which it is exposed. Moreover, the flaps forming the closed end of the bag are securely and permanently fastened together by stitching or otherwise so that the base and sides of the bag cannot blow out or otherwise permit escape of the skirt under high speed operation.

The outer surface of the side flaps 16 and 18 are preferably provided with retainers or fabric pockets 40 into which the shroud lines of the canopy may be stowed in a conventional manner so as to provide an assembly which serves not only to enclose the skirt and shield it from the air stream during the initial stages of opening of the parachute, but also serves as a convenient means for insuring orderly arrangement and retention of the shroud lines themselves for controlled release thereof.

In using the skirt restraining bag illustrated, the canopy is first pleated or folded in a radial direction and arranged with the skirt adjacent the bag and the peak extending therefrom. The skirt and lower portion of the canopy and any guide vanes or extensions thereon are then inserted into the bag and are pushed well into the lower corners adjacent the bottom flap 14. The remainder of the canopy in folded condition extends from the open end of the bag and the shroud lines which extend from the skirt are grouped together and extend outward between the edges of the side flaps 16 and 18 as shown at 42. Further folds of the canopy adjacent the skirt are inserted into the open end of the bag until the bag is filled which preferably requires only about one-fourth of the total length of the folded canopy. The bag closing strap 34 is attached to the exterior of the canopy or to the bag or is otherwise adjacent the open end of the bag and beneath the folds of the canopy when the bag is properly filled. The side flaps 16 and 18 are then folded into overlapping relation and the looped ends 36 of the strap 34 are drawn upward about the canopy and passed through the slots or button holes 30 and 32. The shroud lines which project outward between the overlapping edges of the side flaps 16 and 18 are then formed into the loop 38 and are passed through the looped ends 36 to hold the closed side flaps of the bag in place. In this way, the shroud lines serve to releasably secure the flaps together so as to hold the bag properly closed about the skirt of the parachute canopy. If desired, the portions of the bag near the open end thereof and on opposite sides of the projecting canopy may be further secured together by break threads as indicated at 44.

When, as illustrated, the side flaps of the bag are provided with shroud line retainers 40 the grouped shroud lines extending from the bag closing loop 38 are inserted into the various retainers 40 being looped back and forth as illustrated in Fig. 4.

The portion of the parachute canopy which is thus enclosed within the bag generally constitutes about one quarter of the total length of the folded canopy in a radial direction. It is for this reason that constructions of this type have been referred to as a "quarter bag." However, a greater or lesser portion of the parachute canopy may be enclosed within such a skirt retaining bag if desired.

The bag, when packed as illustrated and described above, is placed within a parachute pack. Any suitable type of parachute pack may be employed such as the back type pack for personnel use as illustrated in Fig. 6. In this construction, the bag 10 may be located near one end of the pack 12 with three quarters or so of the folded parachute canopy projecting beyond the enclosed end of the bag. The projecting portion of the canopy is folded in any suitable way within the pack and, as shown in Fig. 6, the extending portion of the canopy may be arranged in zig-zag folds as shown at 46 and as described in the copending application of Charles E. Carroll, Serial No. 291,818, filed June 4, 1952, now U. S. Patent No. 2,711,869. When the canopy is thus folded, the pack cover may be held in place by retaining members which extend through the pack from the base to the cover for release by a rip cord, static line or any other form of pull or drag device.

It will, of course, be understood that the shape of the skirt retaining bag may be varied considerably from that illustrated and it may be cylindrical in shape or otherwise formed and may be used with parachutes enclosed within pack type, seat type or chest type packs for personnel use or it may be enclosed within any other type of pack for use with cargo parachutes.

When using constructions embodying the present invention the parachute pack is first actuated to release the parachute skirt retaining bag and shroud lines and the folded upper three quarters of the parachute canopy are drawn out by the pilot chute, static lines or other means so as to be extended into substantially the position illustrated in Fig. 1. As the upper portion of the canopy is drawn out, it presents a substantial area to the air stream supplementing the drag of the pilot chute or static line in extending the folded canopy and further serving to draw the shroud lines from the loops 40 or other retainers in which they are stowed. The skirt retaining bag also is drawn out from the pack until the upper portion of the canopy and the lower portion of the shroud lines are fully extended. Moreover, the extended area of the canopy exposed to the air stream serves to pull the canopy outward in a manner which eliminates the danger of the pilot chute, canopy or shroud lines from becoming entangled about the user's arms or legs.

The loop 38 of the shroud lines is finally drawn from the retaining loops 36 on the ends of the bag closing strap 34. The skirt of the canopy is then released and drawn from the skirt retaining bag for exposure to the air stream so that the canopy will open in a predetermined and controlled manner, insuring proper operation thereof. Moreover, the acceleration of each individual fold of canopy within the quarter bag spreads the development of snatch forces over a longer period of time, thus reducing peak forces. Moreover, because of the drag imposed by the upper portion of the canopy any break threads or other means used to hold the bag in place about the skirt will be ruptured or released to free the skirt from the bag. The bag 10 then will float away from the parachute without imposing any strains upon the parachute or interfering with the operation of the canopy.

It will thus be apparent that the only element which need be added to conventional assemblies is the skirt retaining bag and the strap 34. In all other respects, conventional or preferred types of parachute canopies, shroud lines, pilot chutes and packs may be employed without modification. The invention is therefore of general application and may be used with conventional parachutes as well as those which are provided with guide vanes or turbulence producing extensions applied to the skirt.

The action of the skirt retaining bag described is of particular advantage when parachutes are released at high speeds or under other conditions wherein the danger inherent in the entanglement of the lines or injury to the parachute canopy are most frequently encountered.

It will be understood that the skirt retaining bag may be held in closed position by any suitable means other than the shroud lines, and for this purpose mechanical locking means such as cones and pins similar to those employed for closing the pack itself may be used for retaining the skirt retaining bag in place.

When a pilot chute such as that indicated at 4 is used for drawing the canopy from the bag, the pilot chute may be housed within the pack cover or it may be enclosed within a separate pilot chute retaining enclosure such as that illustrated and described in the copending application of Barnes Serial No. 300,368, filed July 22, 1952, now U. S. Patent No. 2,682,382. Furthermore instead of using a pilot chute, the canopy may be drawn from the pack by means of a static line or automatically operating pressure or time actuated devices.

While it is generally preferable to arrange the shroud lines so that they are stowed within retainers upon the exterior of the skirt retaining bag, the shroud lines may, if desired, be stowed in part at least in suitable retainers located in the base of the pack or elsewhere.

It will thus be understood that the particular embodiment of the invention illustrated in the drawings and described above is intended to be illustrative only and is not intended to limit the scope of the invention.

We claim:

1. Means for restraining the skirt portion of a parachute having a canopy and shroud lines, said means comprising an enclosure independent of said canopy for receiving the skirt and lower portion only of a parachute canopy, retaining means for releasably maintaining said enclosure in position to shield the skirt and lower portion of the canopy, and means responsive to full extension of said shroud lines for releasing said retaining means.

2. A restraining device for controlling deployment of a parachute comprising a bag which is closed about one end and open at the other and of sufficient capacity to enclose the skirt and lower portion only of a parachute canopy, said bag having side flaps extending into overlapping relation on one face of the bag between which the upper portion of a parachute canopy may extend, said flaps being separable at the open end thereof, said side flaps having openings therein adjacent the open end of the bag, and means located adjacent said open of the bag and extending through said openings for receiving releasing means to hold the side flaps in restraining relation about that portion of a parachute canopy extending through the open end of the bag.

3. Means for controlling the deployment of a parachute canopy and designed to releasably enclose and shield the skirt and lower portion only of the canopy, said means comprising a bag which is closed at one end and open at the other, side flaps on the bag having free edges arranged for overlapping relation and provided with retaining means thereon located adjacent the open end of the bag, said bag having shroud line retainers secured to the surface thereof, and a shroud line receiving retaining device adapted to receive a shroud line looped therethrough releasably engaging the retaining means on said side flaps for holding the open end of the bag in gripping engagement with the portion of a parachute canopy which projects from the bag releasable by withdrawal of the shroud line loop from the shroud line retaining device to free the open end of the bag.

4. Means for controlling the deployment of a parachute canopy and its shroud lines comprising a bag which is generally rectangular in shape and relatively flat, said bag being of sufficient capacity to enclose the skirt and lower portion only of a parachute canopy to which it is applied so that the peak and upper portion of the canopy will extend from the bag, the bag having a base, an end flap and two side flaps, one end of each side flap and the base of the bag being permanently attached to the end flap so as to close one end of the bag, the outer edges of the side flaps being permanently secured to the base throughout the greater part of the length thereof, the inner edges of the side flaps extending into overlapping relation, the opposite ends of the side flaps and the base cooperating to form the mouth of the bag, said side flaps being provided with flap holding means located adjacent the mouth of the bag and engageable by releasable retaining means for holding the mouth of the bag in engagement with the extending portion of a parachute canopy to which the bag is applied, said bag having shroud line retaining means thereon, and releasable retaining means engaging said flap holding means and responsive to extension of the shroud lines to release the bag from the skirt of the canopy, the bag being wholly detached from any parachute canopy and shroud lines to which it is applied so as to float away from the parachute on deployment thereof.

5. The combination of a parachute having a canopy and shroud lines, means completely separable from said parachute for enclosing the skirt and lower portion of said canopy, said means being in the form of a bag which is closed at one end and open at the other, said bag having side flaps with retaining means thereon adjacent the open end of the bag, and releasable means engageable with said retaining means to hold said bag in skirt enclosing relation, said shroud lines engaging said releasable means to retain the bag in skirt inclosing relation and release the same and permit the bag to open upon withdrawal of the shroud lines from the restraining means incident to extension of the shroud lines.

6. In combination with a parachute, means for controlling deployment of the canopy and shroud lines thereof comprising a bag enclosing the skirt and lower portion of the canopy and having the peak and upper portion of the canopy projecting from the bag, said bag having side flaps thereon extending into overlapping relation, flexible means carried by the canopy and spaced from the skirt and peak thereof for holding the mouth of the bag in engagement with the projecting portion of the canopy, and means operable upon substantially full deployment of the parachute and shroud lines for releasing said flexible means to allow the skirt of the canopy to be exposed to the air stream.

7. In combination with a parachute, means for controlling deployment of the canopy and shroud lines thereof comprising a bag enclosing the skirt and lower portion of the canopy and having the peak and upper portion of the canopy projecting from the bag, means restricting the mouth of the bag and serving to hold the bag in engagement with the projecting portion of the parachute, the shroud lines of the parachute engaging said restricting means to release the same upon extension of the shroud lines during deployment of the parachute.

8. In combination with a parachute, means for controlling deployment of the canopy and shroud lines thereof comprising a bag enclosing the skirt and lower portion of the canopy and having the peak and upper portion of the canopy projecting from the bag, said bag having flaps thereon extending into overlapping relation, flexible means engaging said flaps and serving to hold them in retaining engagement with the projecting portion of said canopy, the shroud lines engaging said flexible means and releasably holding the same in place so as to permit release of the flexible means and flaps upon extension of the shroud lines during deployment of the parachute.

9. In combination with a parachute, means for controlling deployment of the canopy and shroud lines thereof comprising a bag enclosing the skirt and lower portion of the canopy and having the peak and upper portion of the canopy projecting from the bag, said bag having flaps thereon extending into overlapping relation, flexible means attached to the parachute canopy at a point spaced from the skirt and peak thereof and engaging said flaps to hold them in retaining engagement with the projecting portion of said canopy, the shroud lines engaging said flexible means and releasably holding the same in place so as to permit release of the flexible means and flaps upon extension of the shroud lines during deployment of the parachute.

10. The combination comprising a parachute having a canopy and shroud lines, a bag of insufficient capacity to receive the entire canopy having the skirt and lower portion of the canopy enclosed therein with the peak and upper portion of the canopy projecting from the mouth of the bag, said bag having flaps thereon located adjacent the mouth of the bag and movable to release the skirt of the canopy from the bag, releasable means engaging said flaps and serving to restrict the mouth of the bag and holding the flaps in engagement with a portion of the canopy spaced about one quarter of the radial distance from the skirt to the peak of the canopy, said releasable means including a strip of flexible material encircling the canopy adjacent the mouth of the bag and extending through said flaps, the shroud lines of the parachute being looped through said releasable means to be drawn therefrom and release said bag upon extension of the shroud lines during deployment of the parachute, the bag being completely detachable from the parachute so as to float away when the parachute is deployed.

11. The combination comprising a parachute having a canopy and shroud lines, a bag of insufficient capacity to receive the entire canopy having the skirt and lower portion of the canopy enclosed therein with the peak and upper portion of the canopy projecting from the mouth of the bag, said bag having flaps thereon located adjacent the mouth of the bag and movable to release the skirt of the canopy from the bag, releasable means attached to the parachute canopy at a point spaced about one quarter of the radial distance from the skirt to the peak of the canopy, said releasable band means encircling the canopy and having looped ends extending through said flaps of the bag to hold the mouth of the bag temporarily closed, the shroud lines of the parachute being looped through the looped ends of said releasable means to be drawn therefrom and release said bag and the canopy skirt portion upon extension of the shroud lines from said looped ends during deployment of the parachute, the bag being completely detachable from the parachute so as to float away when the parachute is deployed.

12. A parachute pack comprising a cover, a parachute including a canopy and shroud lines enclosed within said cover, a bag housed within said cover and enclosing the skirt and lower portion only of the parachute, the upper portion of the parachute canopy being folded upon itself with the pack cover, the shroud lines also being enclosed within the pack and including a loop thereof serving to hold the bag in restraining engagement about the skirt of the canopy, the bag being completely detachable from the parachute whereby upon opening of pack cover the upper portion of the canopy will be exposed to the air stream to draw out the major portion of the canopy and extend the shroud lines before the skirt of the canopy is exposed and thereafter to release the bag so that it will be stripped off the lower portion of the canopy and float away as the skirt of the canopy expands.

13. In combination with a parachute having a canopy with peak and skirt portions and shroud lines extending from the skirt portion adapted to be connected to a load to be lowered by the parachute, means for controlling deployment of the canopy and shroud lines thereof comprising a bag enclosing the skirt and lower portion of the canopy with the shroud lines, peak and the upper portion of the canopy projecting from the mouth of said bag, said bag having side flaps thereon extending into overlapping relation adjacent said mouth to retain said skirt and lower portion of the canopy therein, releasable means engaging said side flaps to retain said flaps in said overlapping relation, said extending shroud lines removably engaging said releasable means and withdrawable from said release means upon substantially full deployment of the parachute to release said release means to release the overlapping ends of the flaps so that the flaps are free to open and release the skirt portion of the canopy for withdrawal from the bag so that canopy will be fully exposed to the air stream and the bag will be free to separate from the canopy.

References Cited in the file of this patent

UNITED STATES PATENTS

| 1,811,050 | Hoffman | June 23, 1931 |
| 2,337,168 | Smith | Dec. 21, 1943 |
| 2,495,341 | Moran | Jan. 24, 1950 |
| 2,583,905 | Thompson | Jan. 29, 1952 |
| 2,663,525 | Smith | Dec. 22, 1953 |

FOREIGN PATENTS

| 350,265 | Great Britain | June 11, 1931 |